US011898391B2

(12) United States Patent
Gorontzi

(10) Patent No.: US 11,898,391 B2
(45) Date of Patent: Feb. 13, 2024

(54) HINGE AND SYSTEM FOR DETACHABLY CONNECTING A DOOR TO A FRAME

(71) Applicant: DIRAK Dieter Ramsauer Konstruktionselemente GmbH, Ennepetal (DE)

(72) Inventor: Armin Gorontzi, Herdecke (DE)

(73) Assignee: DIRAK Dieter Ramsauer Konstruktionselemente GmbH, Ennepetal (DE)

( * ) Notice: Subject to any disclaimer, the term of this patent is extended or adjusted under 35 U.S.C. 154(b) by 90 days.

(21) Appl. No.: 17/625,855

(22) PCT Filed: Jun. 4, 2020

(86) PCT No.: PCT/EP2020/065413

§ 371 (c)(1),
(2) Date: Jan. 10, 2022

(87) PCT Pub. No.: WO2021/004700

PCT Pub. Date: Jan. 14, 2021

(65) Prior Publication Data

US 2022/0259908 A1 Aug. 18, 2022

(30) Foreign Application Priority Data

Jul. 11, 2019 (DE) ..................... 10 2019 118 758.3

(51) Int. Cl.
*E05D 7/10* (2006.01)
*E05D 5/12* (2006.01)

(52) U.S. Cl.
CPC ........... *E05D 7/1055* (2013.01); *E05D 5/128* (2013.01)

(58) Field of Classification Search
CPC ... E05D 7/1022; E05D 7/1005; E05D 7/1027; E05D 7/1055; E05D 7/123; E05D 3/02;
(Continued)

(56) References Cited

U.S. PATENT DOCUMENTS

| | | | | |
|---|---|---|---|---|
| 713,338 A * | 11/1902 | Paquette | ................. | E05D 5/128 16/381 |
| 1,379,814 A * | 5/1921 | Gustafson | ................. | E05D 3/02 16/335 |

(Continued)

FOREIGN PATENT DOCUMENTS

| | | |
|---|---|---|
| CH | 664596 A5 | 3/1988 |
| CN | 201396001 Y | 2/2010 |

(Continued)

*Primary Examiner* — Chuck Y Mah
(74) *Attorney, Agent, or Firm* — The Webb Law Firm

(57) ABSTRACT

The invention relates to a hinge for releasably connecting a door to a frame, including: a frame part for fastening to the frame, a door part for fastening to the door, a hinge pin having a pin axis and a locking element. The frame part and the door part are movable relative to one another along the pin axis between a pivoted position and an installed position; in the pivoted position the frame part and the door part are connected to one another in such a way that the frame part and the door part are pivotable relative to one another about the pin axis between an open position and a closed position. The locking element is adjustable between a locking position and a release position, and the movement of the frame part and of the door part relative to one another along the pin axis from the pivoted position into the installed position is positively inhibited by the locking element the locking position and is freed by the locking element in the release position, the locking element being retained on the frame part or on the door part so as to be adjustable between the locking position and the release position.

22 Claims, 6 Drawing Sheets

(58) Field of Classification Search
CPC .. E05D 5/02; E05D 5/12; E05D 5/128; E05D 15/26; E05D 7/1061; E05D 2011/1092; E05D 2005/108; E05Y 2900/132; E05Y 2900/531; A47B 2220/0072
See application file for complete search history.

(56) References Cited

U.S. PATENT DOCUMENTS

| | | | | | |
|---|---|---|---|---|---|
| 3,733,649 | A | * | 5/1973 | Nagy | E05D 11/0018 16/380 |
| 4,135,273 | A | * | 1/1979 | Holmes | E05D 11/0027 16/388 |
| 4,864,688 | A | | 9/1989 | Gerber | |
| 5,666,695 | A | | 9/1997 | Jergers et al. | |
| 5,711,053 | A | * | 1/1998 | Hafner | E05D 5/128 16/380 |
| 5,722,121 | A | | 3/1998 | Lau et al. | |
| 11,072,953 | B2 | * | 7/2021 | Georg | E05D 5/128 |
| 2006/0174445 | A1 | | 8/2006 | Kim | |
| 2008/0295285 | A1 | * | 12/2008 | Clymer | E05D 7/1022 16/229 |
| 2009/0007376 | A1 | | 1/2009 | Lin | |
| 2013/0069511 | A1 | * | 3/2013 | Westby | E05D 5/12 312/326 |
| 2017/0268269 | A1 | * | 9/2017 | Nicholas, III | E05D 7/1055 |
| 2018/0202206 | A1 | * | 7/2018 | Klaffke | E05D 3/02 |
| 2021/0332623 | A1 | | 10/2021 | Reuter et al. | |

FOREIGN PATENT DOCUMENTS

| | | | | | |
|---|---|---|---|---|---|
| DE | 1584006 | A1 | * | 1/1970 | |
| DE | 3314753 | A1 | | 10/1984 | |
| DE | 19521539 | A1 | * | 12/1996 | E05D 15/5205 |
| DE | 29517780 | U1 | | 3/1997 | |
| DE | 102016117378 | B3 | | 5/2017 | |
| DE | 102017108586 | B3 | * | 12/2017 | A47B 81/00 |
| DE | 102017108586 | B3 | | 12/2017 | |
| GB | 2204910 | A | | 11/1988 | |

* cited by examiner

HINGE AND SYSTEM FOR DETACHABLY CONNECTING A DOOR TO A FRAME

CROSS-REFERENCE TO RELATED APPLICATIONS

This application is the United States national phase of International Application No. PCT/EP2020/065413 filed Jun. 4, 2020, and claims priority to German Patent Application No. 10 2019 118 758.3 filed Jul. 11, 2019, the disclosures of which are hereby incorporated by reference in their entirety.

BACKGROUND OF THE INVENTION

Field of the Invention

The invention relates to a hinge for detachably connecting a door to a frame, comprising: a frame part for fastening to the frame, a door part for fastening to the door, a hinge pin with a pin axis and a locking element, wherein the frame part and the door part can be moved relative to one another along the pin axis between a swivel position and an assembly position, wherein the frame part and the door part are connected to one another in the swivel position in such manner that the frame part and the door part can be swivelled relative to one another about the pin axis between an open position and a closed position, wherein the locking element can be adjusted between a locking position and a release position, wherein the movement of the frame part and of the door part from the swivel position to the assembly position is blocked in a positive-locking manner by the locking element in the locking position and is released in the release position, and wherein the locking element is held on the frame part or on the door part so as to be adjustable from the locking position to the release position and back.

Description of Related Art

In addition, the invention relates to a system for the detachable connection of a door to a frame, comprising: a frame, preferably formed by a sheet metal cabinet, a door, preferably a sheet metal cabinet door, and a hinge.

Hinges are basically used to connect two components to one another so as to be swivelable about an axis. The assembly of doors on corresponding frames represents a large area of application for hinges. For example, house doors or room doors can be assembled on frames provided for this purpose or furniture doors on frames formed by corresponding furniture by means of hinges. Hinges are also used in control cabinets to assemble the control cabinet doors on the frames provided by the control cabinets.

Regardless of the type of door and the frame, the door is assembled on the frame by one or a plurality of connections, hereinafter referred to as hinge connections, being made between the door and the frame using one or a plurality of hinges. For each hinge connection, a frame part of the hinge is usually first fastened to the frame and a door part of the hinge is fastened to the door. The frame part and the door part can then be swivelably connected to one another by means of a hinge pin of the hinge and thus the hinge connection can be made. The door is disassembled from the frame accordingly by loosening the one or plurality of hinge connections existing between the door and the frame. This is usually done by loosening the connection between the frame part and the door part made via the hinge pin. Then, if necessary, the door part can then be detached from the door and/or the frame part from the frame.

In practice, hinges must meet different, sometimes conflicting requirements. The hinges, on the one hand, should enable quick and easy assembly of the door on the frame and disassembly of the door from the frame. On the other hand, however, the connection between the frame part and the door part, in particular when swivelling the door, should also as far as possible be prevented from unintentionally loosening and the door accidentally unhinging. Last but not least, the hinges should also enable simple, fast and therefore cost-effective production. These requirements have not yet been met to a satisfactory extent by the known solutions.

SUMMARY OF THE INVENTION

The object underlying the invention is therefore to design and further develop the hinge mentioned at the outset and described in more detail above as well as the system mentioned at the outset and described in more detail above in such manner that a hinge connection can be easily and quickly made and released at low production costs of the hinge and at the same time an accidental unhinging of the door is prevented as far as possible.

This object is achieved by a hinge for detachably connecting a door to a frame, comprising: a frame part for fastening to the frame, a door part for fastening to the door, a hinge pin with a pin axis and a locking element, wherein the frame part and the door part can be moved relative to one another along the pin axis between a swivel position and an assembly position, wherein the frame part and the door part are connected to one another in the swivel position such that the frame part and the door part can be swivelled relative to one another about the pin axis between an open position and a closed position, wherein the locking element can be adjusted between a locking position and a release position, wherein the movement of the frame part and the door part from the swivel position to the assembly position is blocked in a positive-locking manner by the locking element in the locking position and is released in the release position, and wherein the locking element is held on the frame part or on the door part so as to be adjustable from the locking position to the release position and back.

The hinge according to the invention is suitable for swivelably connecting a door to a frame. For this purpose, the hinge has a frame part and a door part, wherein the hinge can be fastened to the frame with the frame part and to the door with the door part. In this case, it may be advantageous in terms of a simple and, at the same time, stable connection of the hinge to the frame and/or to the door if the frame part has fastening means for fastening to the frame and/or the door part has fastening means for fastening to the door. For the sake of simplicity, the fastening means can be designed as boreholes regardless of whether they are provided on the frame part or the door part. Alternatively or additionally, it may be advantageous if the frame part and/or the door part are in each case designed in one piece. In this way, not only is simple and cost-effective production made possible, but also a high stability of the frame part and/or of the door part. With regard to the high stability of the frame part and/or of the door part, it may also be advisable if the frame part and/or the door part are made of a metallic material, in particular of steel or aluminium. Alternatively, it is also possible for the frame part and/or the door part to be made of plastic.

In addition to the frame part and the door part, the hinge also comprises a hinge pin, which has a pin axis. The pin axis can preferably be the longitudinal axis of the hinge pin. The longitudinal axis of the hinge pin can in particular be understood to mean the symmetry axis of the hinge pin along which the spatial extension of the hinge pin is greatest. Regardless of this, it may be advantageous in terms of simple and cost-effective production as well as high stability of the hinge pin if it is designed in one-piece. Alternatively or additionally, the hinge pin can be made of a metallic material, in particular of steel or aluminium. This can have a positive effect on the stability of the hinge pin. Alternatively, it is also possible that the hinge pin is made of plastic.

The frame part and the door part can be moved relative to one another between a swivel position and an assembly position along the pin axis. In this case, a movement along the pin axis can be understood as a movement in a direction, whose directional component parallel to the pin axis is at least as large, preferably at least twice as large, as its directional component perpendicular to the pin axis. In particular, however, a movement along the pin axis is understood as a movement in a direction which is arranged parallel or collinear to the pin axis.

In the swivel position, the frame part and the door part are connected to one another so as to be swivelable about the pin axis relative to one another, namely between an open position and a closed position. In this case, the frame part and the door part assume a different angular position relative to one another in the open position than in the closed position. Thus, the closed position can be used to arrange the door relative to the frame in a closed position and/or the open position can be used to arrange the door relative to the frame in an open position. Regardless of this, it may be advantageous if the frame part and the door part are swivelled by at least 45°, preferably at least 70°, in particular at least 90° relative to one another in the open position compared to the closed position.

In the assembly position, the connection between the frame part and the door part can be disengaged. This makes it easy to assemble and disassemble the door. In this case, the connection between the frame part and the door part can be made in a simple manner solely by moving the frame part and the door part from the assembly position to the swivel position and can also simply be disengaged solely by moving the frame part and the door part from the swivel position to the assembly position.

In order to prevent the frame part and the door part from unintentionally reaching the assembly position from the swivel position, which may lead to unintentional unhinging of the door, the hinge finally has a locking element. The locking element can be adjusted between a locking position and a release position. In this case, the locking element blocks the movement of the frame part and of the door part relative to one another along the pin axis from the swivel position to the assembly position in a positive-locking manner when the locking element is in the locking position, and preferably independently of the angular position which the frame part and the door part assume relative to one another. If, in contrast, the locking element is in the release position, the locking element releases the movement of the frame part and of the door part relative to one another along the pin axis from the swivel position to the assembly position. In this case, it is expedient if the locking element as far as possible does not impair the ability of the frame part and the door part to swivel relative to one another. In the swivel position, the frame part and the door part can preferably also be swivelled relative to one another about the pin axis between the open and the closed position when the locking element is in the locking position and/or in the release position. Regardless of this, it may be advantageous in terms of the stability and service life of the locking element if the locking element is made of a metallic material, in particular of steel or aluminium. Alternatively, it is also possible that the locking element is made of plastic.

In order to improve the handling of the locking element and thus enable simpler and faster assembly and disassembly of the door, the locking element is held on the frame part or on the door part such that the locking element can be adjusted between the locking position and the release position. In this case, the locking element is preferably held undetachably on the frame part or on the door part. This prevents accidental loss of the locking element, which can also have a positive effect on the handling of the locking element. In terms of the handling of the locking element, it may alternatively or additionally also be advantageous if the locking element is held on the frame part or the door part so as to be movable between the locking position and the release position. However, particularly good handling of the locking element can be achieved if the locking element is held on the frame part so as to be swivelable about a swivel axis between the locking position and the release position. In this case, the swivel axis is preferably arranged in such manner that it is arranged at least substantially parallel to the pin axis when the frame part and the door part are in the swivel position.

According to one configuration of the hinge, the frame part and the door part are adjustable relative to one another between two different swivel positions for connecting the door to opposite sides of the frame. In this case, the frame part and the door part can assume a further (second) swivel position relative to one another in addition to the (first) swivel position already described. For example, one of the two swivel positions can be used to connect the door to the right side of the frame and the other of the two swivel positions can be used to connect the door to the left side of the frame. This allows the same hinge to be used to connect the door to different sides of the frame. It is therefore no longer necessary to adapt the hinge type to the side of the frame to which the door is to be connected. This reduces the number of types of hinges to be produced, which enables a reduction in production costs. In this case, it is expedient for the frame part and the door part to be connected to one another so as to be swivelable about the pin axis relative to one another between a closed position and an open position in each case.

If two different swivel positions are provided, it may also be advisable if the frame part and the door part can be moved relative to one another along the pin axis from the swivel positions to an assembly position and back. In this way, the frame part and the door part can be easily and quickly adjusted between the two swivel positions. This applies in particular if the connection between the frame part and the door part is disengaged in both assembly positions. Regardless of this, it can be provided that in both swivel positions the movement of the frame part and of the door part relative to one another along the pin axis from the respective swivel position to the associated assembly position is in each case blocked in a positive-locking manner by the locking element in the locking position and is released in the release position. In this way, in both swivel positions of the frame part and of the door part, the frame part and the door part can be prevented from accidentally moving from the corresponding swivel position to the associated assembly position without an additional locking element having to be provided for this purpose. This applies in particular if, in both swivel positions, the movement of the frame part and of the door part from the corresponding swivel position to the associated assembly position is in each case blocked in a positive-locking manner by the locking element in the locking position regardless of the angular position which the frame part and the door part assume relative to one another.

A further configuration of the hinge envisages the locking element in the locking position being connected in a positive-locking manner to the hinge pin in such manner that the movement of the frame part and of the door part, in particular relative to one another along the pin axis, is blocked from the swivel position to the assembly position. If the frame part and the door part are in the swivel position and the locking element is in the locking position, a positive-locking connection acts between the locking element and the hinge pin, which prevents the frame part and the door part from moving relative to one another along the pin axis from the swivel position to the assembly position, in particular regardless of the angular position which the frame part and the door part assume relative to one another. Thus, in a constructively simple manner, the frame part and the door part can be prevented from accidentally moving from the swivel position to the assembly position. However, in order to simultaneously enable a problem-free movement of the frame part and of the door part from the swivel position to the assembly position in the release position of the locking element, it may be advantageous if the positive-locking connection between the locking element and the hinge pin is disengaged in the release position of the locking element. In the event that the frame part and the door part can assume two different swivel positions, it may be advantageous for the aforementioned reasons if, in each of the swivel positions, the locking element is correspondingly connected in a positive-locking manner to the hinge pin in the locking position and, preferably, in each of the two swivel positions, this positive-locking connection is disengaged in the release position of the locking element.

According to a further configuration of the hinge, the hinge pin has a locking groove. The locking element can then engage in a positive-locking manner into the locking groove when the frame part and the door part are in the swivel position. In this way, a positive-locking connection between the locking element and the hinge pin can be made in a constructively simple manner. In order to be able to provide the positive-locking connection regardless of the angular position between the frame part and the door part, it may also be advisable if the locking groove is designed circumferentially around the hinge pin. The locking element can then preferably engage into the locking groove regardless of the relative angular position between the frame part and the door part. Regardless of this, the locking element is advantageously arranged outside the locking groove in the release position. This ensures that the frame part and the door part can be adjusted problem-free from the swivel position to the assembly position. Alternatively or additionally, in the event that the frame part and the door part can be adjusted between two different swivel positions, it may also be advisable for the aforementioned reasons if the hinge pin has two correspondingly designed locking grooves. The locking element can then engage into one or the other locking groove accordingly in the locking position, depending on which of the two swivel positions the frame part and the door part are located.

According to a further design of the invention, it can be provided that the frame part has a contact surface for contact with the frame or the door part has a contact surface for contact with the door. The contact surface can then be designed in such manner that the door resting on the contact surface or the frame resting on the contact surface, when swivelling the frame part and the door part from the open position to the closed position, moves, in particular swivels, the locking element from the release position to the locking position. The locking element can then, if it is in the release position, be automatically adjusted to the locking position by contact with the door or the frame when the frame part and the door part are swivelled from the open position to the closed position. This prevents the locking element from accidentally remaining in the release position, for example after the door has been assembled on the frame.

Alternatively or additionally, the contact surface of the frame part or of the door part can also be designed in such manner that the frame resting on it or the door resting on it blocks the adjustment, in particular the swivelling, of the locking element from the locking position to the release position in a positive-locking manner when the frame part and the door part are in the closed position. This prevents the locking element from being adjusted from the locking position to the release position in the closed position of the frame part and of the door part. This has the advantage that when the door is closed, it is significantly more difficult for unauthorised persons to unhinge the door. If two different swivel positions and accordingly two different closed positions are provided, it may be advantageous if the door resting on the contact surface or the frame resting on the contact surface blocks the adjustment of the locking element accordingly regardless of which of the two closed positions the frame part and the door part are located.

The locking element can alternatively or additionally be prevented from accidentally remaining in the release position, for example after assembly of the door, by the locking element being adjustable against the restoring force of a spring means from the release position to the locking position and in the direction of the restoring force of the spring means from the release position to the locking position. Thus, the restoring force of the spring means can cause the locking element to be automatically adjusted into the locking position if the locking element is not held in the release position by an external force, for example by the user.

A further configuration of the hinge envisages the frame part and the door part being connected to one another in a positive-locking manner in the closed position in such manner that the movement of the frame part and of the door part, in particular relative to one another along the pin axis, is blocked in a positive-locking manner from the swivel position to the assembly position. Thus, in the closed position of the frame part and of the door part, regardless of whether the locking element is in the release position or the locking position, a positive-locking connection between the frame part and the door part can act, which blocks the movement of the frame part and of the door part from the swivel position to the locking position. If the door part and the frame part are in the closed position, the movement from the swivel position to the assembly position can therefore not only be blocked in a positive-locking manner by the locking element, but also by the, in particular direct, positive-locking connection between the frame part and the door part. In this way, in the closed position of the frame part and of the door part, it is significantly more difficult to unhinge the door, which can offer a safety advantage. However, in order to ensure that it can be easily unhinged when the door is open, it is expedient for the positive-locking connection between the frame part and the door part to be disengaged in the open position. In the open position of the frame part and of the door part, the positive-locking connection between the frame part and the door part blocking the movement from the swivel position to the assembly position is preferably thus disengaged. Then, the positive-locking connection between the frame part and the door part blocking the movement from the swivel position to the assembly position, can be made in a simple manner by swivelling from the open position to the closed position and can be disengaged by swivelling from the closed to the open position. If two swivel positions and accordingly also two closed and open positions are provided, it may also be advantageous for the aforementioned reasons if the frame part and the door part are correspondingly connected to one another in a positive-locking manner in both closed positions and, preferably, the positive-locking connection is disengaged in both open positions.

Regardless of whether one or two swivel positions are provided, it is further proposed for this configuration that the frame part has a closure receiver and the door part has a closure element or that the frame part has a closure element and the door part has a closure receiver. In this way, in the closed position of the frame part and of the door part, the locking element can engage into the closure receiver with the formation of the positive-locking connection between the frame part and the door part, which in particular blocks the movement of the frame part and of the door part from the swivel position to the assembly position. Thus, the positive-locking connection between the frame part and the door part blocking the movement of the frame part and of the door part from the swivel position to the assembly position can be made in a constructively simple manner. In the event that two swivel positions and accordingly also two closed positions are provided, it may be advantageous for the same reason if the frame part or the door part has two closure receivers. Then, depending on which of the closed positions the frame part and the door part are located, the closure element can engage into one or the other closure receiver accordingly. Alternatively, the frame part or the door part can also have two closure elements such that depending on which of the closed positions the frame part and the door part assume, the closure element can either engage into one or the other closure receiver accordingly.

According to a further configuration, the hinge pin has an adjustment surface arranged at an angle to the pin axis, which is suitable for adjusting, in particular swivelling, the locking element from the locking position to the release position when the frame part and the door part are moved from the assembly position to the swivel position. Thus, the locking element can only be adjusted from the locking position to the release position by moving the frame part and the door part from the assembly position to the swivel position. This has the advantage that when the door is assembled, the locking element does not first have to be adjusted to the release position by the user and, if necessary, held there, but rather that the door can be easily mounted regardless of the position in which the locking element is located. In this way, the assembly of the door on the frame can be further simplified. With regard to a simple adjustment of the locking element, it is advisable if the adjustment surface forms an angle between 15° and 60°, preferably between 30° and 50° with the pin axis. For the same reason, it may alternatively or additionally be advantageous if the adjustment surface is circumferentially and/or conically designed around the hinge pin. Regardless of this, the hinge pin can also have two correspondingly designed adjustment surfaces, in particular if the frame part and the door part can assume two swivel positions and assembly positions. Then, depending on from which of the two assembly positions the frame part and the door part can be adjusted to the associated swivel position, either one adjustment surface or the other adjustment surface can cause the adjustment of the locking element from the locking position to the release position. This can be implemented particularly easily in terms of construction if the two adjustment surfaces are assigned to different longitudinal ends of the hinge pin.

According to a further configuration of the invention, it can be provided that the frame part or the door part has a pin receiver. As a result, the hinge pin can be received in the pin receiver in sections in the swivel position of the frame part and of the door part, in particular in the swivel positions of the frame part and of the door part. Thus, in a constructively simple and cost-effective manner, it is possible to implement the swivelling ability between the frame part and the door part in the swivel position, in particular in the swivelling positions. This applies in particular if the pin receiver is designed in a sleeve shape at least in sections. Alternatively or additionally, it may be expedient if, in the swivel position, in particular in the swivel positions, the hinge pin is held in a positive-locking manner in the pin receiver perpendicular to the pin axis, and preferably regardless of which angular position the frame part and the door part assume relative to one another. In this way, it can be ensured that the connection between the frame part and the door part does not accidentally come loose when they are swivelled relative to one another.

In addition to the pin receiver, it is further proposed that it has a recess through which the locking element can partially engage in the locking position. This enables a compact and stable configuration of the hinge. This applies in particular if the recess is arranged between the two longitudinal ends of the pin receiver, i.e. in particular is arranged spaced apart from the two longitudinal ends. Regardless of this, it may also be advantageous in terms of the compactness and stability of the hinge if, in the swivel position, in particular in the swivel positions, of the frame part and of the door part, the locking element engages in the locking position through the recess into the locking groove of the hinge pin.

According to a further configuration of the hinge, the locking element can be adjusted from the locking position to the release position and back without tools. Thus, the hinge can preferably be adjusted manually between the locking position and the release position without additional tools. In this way, the handling of the hinge can be further improved, so that the assembly and disassembly of the door can be carried out more easily and in less time.

Finally, a further configuration of the hinge is characterised in that the hinge pin is fastened on the frame part or on the door part. This has the advantage that the hinge pin does not have to be brought into position and held there separately by the user during assembly and disassembly of the door, but can be easily adjusted and held together with the frame part or the door part. This applies in particular if the hinge pin is fastened stationary on the frame part or the door part. For the sake of simplicity, the hinge pin and the frame part or the hinge pin and the door part can then also be designed in one piece.

The object described above is also achieved by a system for detachably connecting a door to a frame, comprising: a frame, a door and a hinge for detachably connecting the door to the frame. The system is characterised in that the hinge is designed as described herein. With such a system, the aforementioned advantages of the hinge are particularly effective. This applies in particular if the frame and the door belong to a sheet metal cabinet. Then, the frame can be formed by the sheet metal cabinet, in particular by the body of the sheet metal cabinet, and the door can be a sheet metal cabinet door.

BRIEF DESCRIPTION OF THE DRAWINGS

The invention will be explained in more detail below with reference to a drawing which simply represents a preferred exemplary embodiment, in which is shown.

DESCRIPTION OF THE INVENTION

Figure 1B:
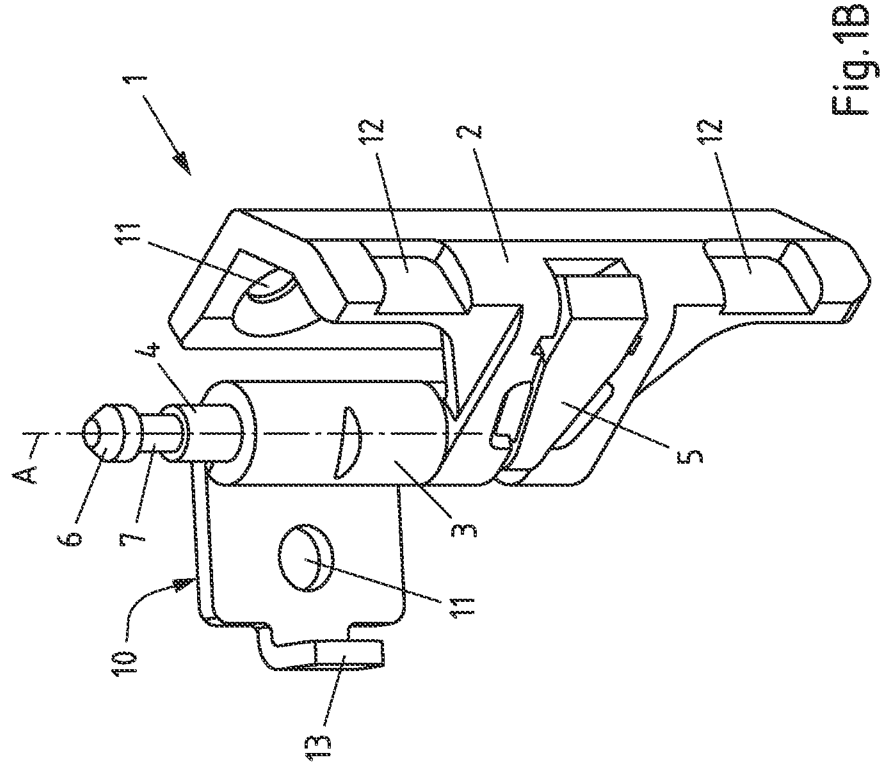
FIG. 1A-1D: a hinge according to the invention in different assembly positions and swivel positions in perspective view.
Figure 1A:
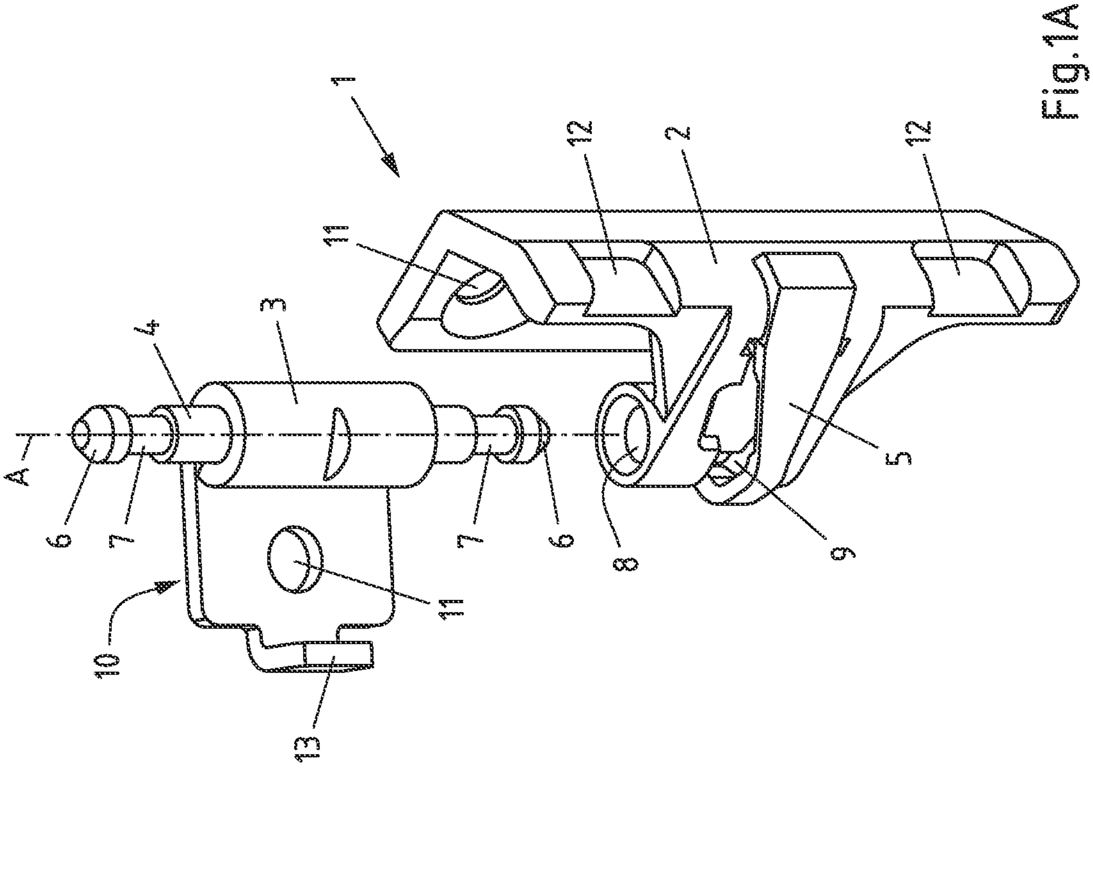

FIG. 1A and FIG. 1B show a hinge 1 according to the invention for detachably connecting a door to a frame in a perspective view. The hinge 1 has a frame part 2, a door part 3, a hinge pin 4 and a locking element 5. The locking element 5 is arranged on the frame part 2 and the hinge pin 4 is arranged on the door part 3. Unlike in FIG. 1A and FIG. 1B, the arrangement could also be reversed; the locking element 5 could therefore be arranged on the door part 3 and the hinge pin 4 could be arranged on the frame part 2. The locking element 5 is held swivelably on the frame part 2 so that the locking element 5 can be swivelled relative to the frame part 2 about a swivel axis. The locking element 5 can be adjusted between a locking position (FIG. 1B) and a release position (FIG. 1A). In contrast, the hinge pin 4 is rigidly connected to the door part 3 in the case of the hinge 1 represented.

The hinge pin 4 has a pin axis A, which corresponds to the longitudinal axis of the hinge pin 4 for the hinge 1 represented. In addition, the hinge pin 4 has a conical adjustment surface 6 at its two longitudinal ends, which tapers in the direction of the associated longitudinal end of the hinge pin 4. Thus, the adjustment surfaces 6 in the represented and in this respect preferred exemplary embodiment each form an angle of approx. 35° with the pin axis A. Between the two adjustment surfaces 6, the hinge pin 4 also has two locking grooves 7, each of which are designed circumferentially around the hinge pin 4. The frame part 2 has a pin receiver 8, which is designed in a sleeve shape, in particular cylindrically and serves to receive the hinge pin 4 in itself. The pin receiver 8 has a recess 9 into which the locking element 5 can engage.

The frame part 2 and the door part 3 can be moved relative to one another along the pin axis A between a swivel position (FIG. 1B) and an assembly position (FIG. 1A). In the swivel position (FIG. 1B), the hinge pin 4 of the door part 3 is pushed into the pin receiver 8 of the frame part 2, in the assembly position (FIG. 1A), the hinge pin 4 is, in contrast, arranged outside the pin receiver 8.

The door part 3 has a contact surface 10 in the region between the two locking grooves 7 on its outer side, by means of which the door part 3 can be placed on a door (not represented in FIG. 1A and FIG. 1B). In order to be able to fasten the door part 3 in a simple manner on the door resting on the contact surface 10, the door part 3 also has a fastening element in the form of a borehole 11. The door part 3 can for example be screwed to the door via this borehole 11. Likewise, the frame part 2 has two boreholes 11 via which the frame part 2 can for example be screwed to the frame.

The frame part 2 has a closure receiver 12 and the door part 3 has a closure element 13. Alternatively to this, the frame part 2 could have a closure element 13 and the door part 3 could have a closure receiver 12. The closure element 13 engages into the closure receiver 12 in the closed position of the frame part 2 and of the door part 3 by way of the closure receiver 12 and the closure element 13.

Figure 1D:
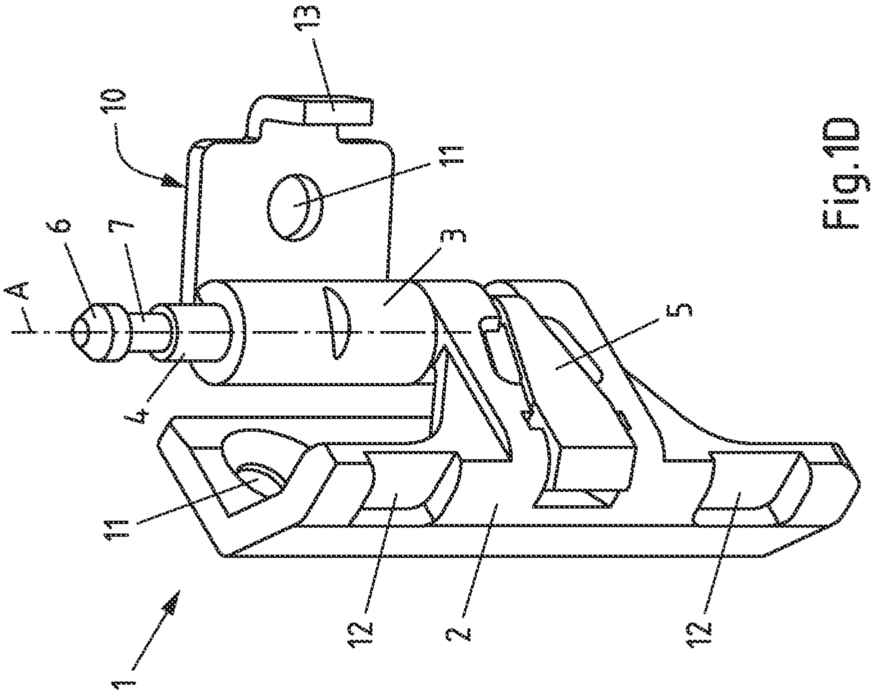
Figure 1C:
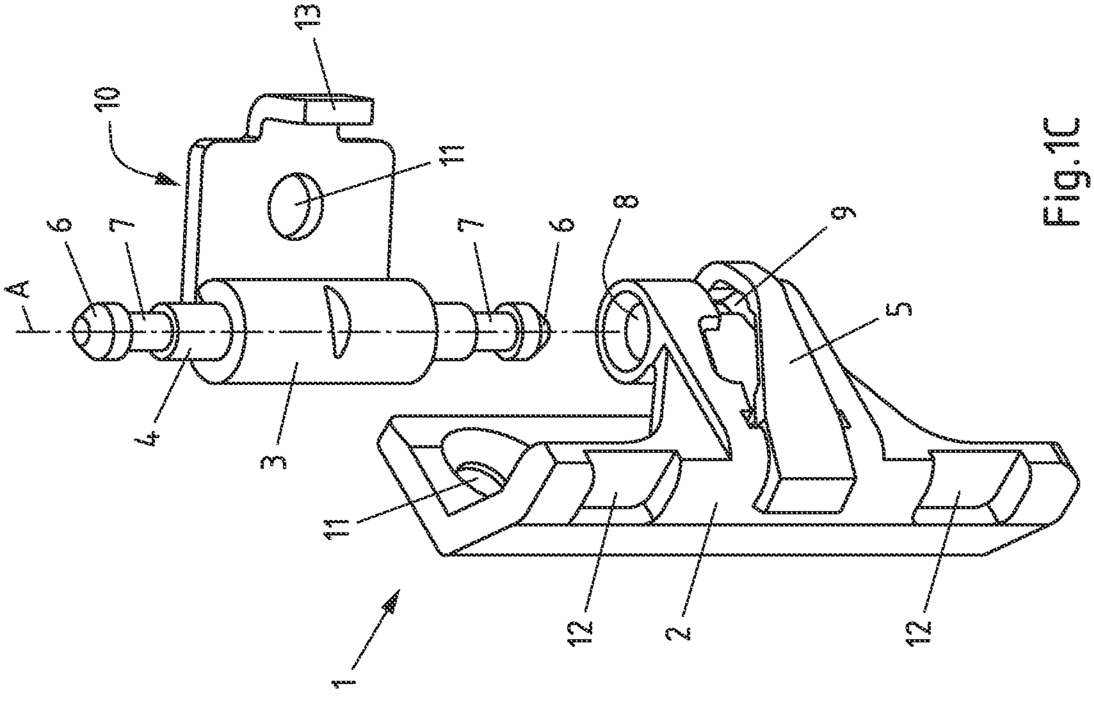

FIG. 1C and FIG. 1D also show a hinge 1 according to the invention for detachably connecting a door to a frame in a perspective view. The regions of the hinge 1 already described in connection with FIG. 1A and FIG. 1B are provided in FIG. 1C and FIG. 1D with corresponding reference numerals. A difference with the configuration of the hinge 1 shown in FIG. 1A and FIG. 1B is that, in the case of the configuration of the hinge 1 shown in FIG. 1C and FIG. 1D, both the frame part 2 and the door part 3 have been rotated (rotation by 180°). In this way, it is possible to fasten a door both on the left side of a frame and to the right side of a frame using the hinge 1. The ability to use the hinge 1 on both sides is achieved in that both the frame part 2 and the door part 3 are designed in a mirror-symmetrical manner (i.e. they have one symmetry plane). In particular, the door part 3 has a hinge pin 4, which extends in two opposing directions (along the pin axis A) and the frame part 2 has two pin receivers 8 suitable for this purpose, into which the hinge pin 4 can be pushed from two opposing sides. FIG. 1C shows the hinge 1 in the assembly position and the locking element 5 in the release position and FIG. 1D shows the hinge 1 in the swivel position and the locking element 5 in the locking position.

Figure 2:
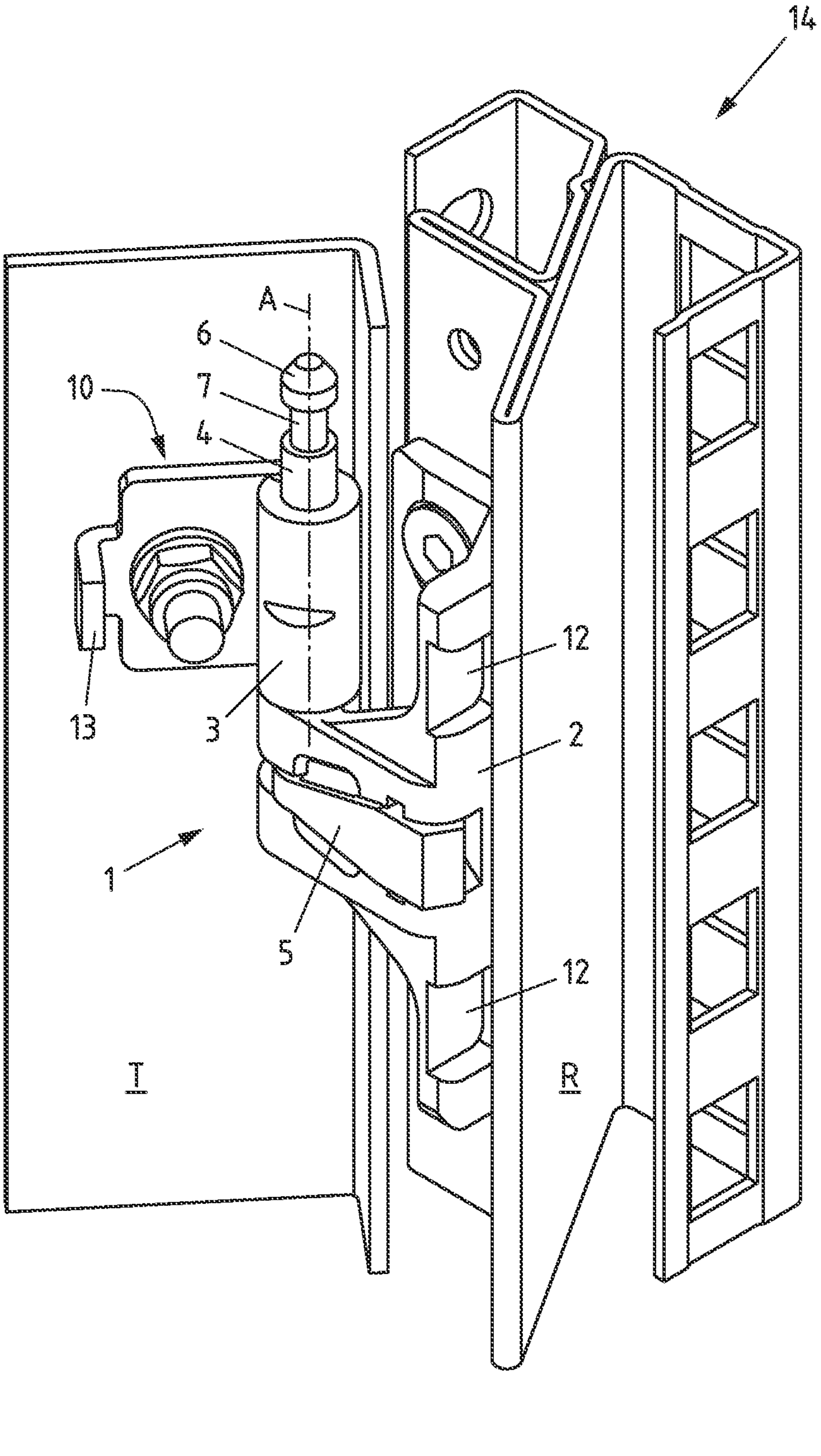
FIG. 2: a system according to the invention with a frame, a door and the hinge from FIG. 1A-FIG. 1D in perspective view.

In FIG. 2 is a system 14 according to the invention with a frame R, a door T and the hinge 1 from FIG. 1A-FIG. 1D in perspective view. The regions of the hinge 1 already described in connection with FIG. 1A to FIG. 1D are also provided in FIG. 2 with corresponding reference numerals. Both the frame R and the door T are only represented in sections. The frame part 2 is screwed to the frame R and the door part 3 is screwed to the door T. The configuration and position of the hinge 1 corresponds approximately to that in FIG. 1B, the hinge 1 is thus represented in the swivel position and the locking element 5 is represented in the locking position. In the swivel position represented, the frame part 2 and the door part 3 can be swivelled relative to one another about the pin axis A between an open position and a closed position. In the locking position also represented, the movement of the frame part 2 and of the door part 3 relative to one another along the pin axis A is blocked by the locking element 5.

FIG. 3A to FIG. 3F show the system 14 according to the invention from FIG. 2 in different swivel positions in perspective view. The regions of the hinge 1 already described in connection with FIG. 1A to FIG. 2 are also provided in FIG. 3A to FIG. 3F with corresponding reference numerals. In FIG. 3A to FIG. 3F, the hinge 1 is continuously in the swivel position, the hinge pin 4 of the door part is therefore always pushed into the pin receiver 8 of the frame part 2.

Figure 3A:
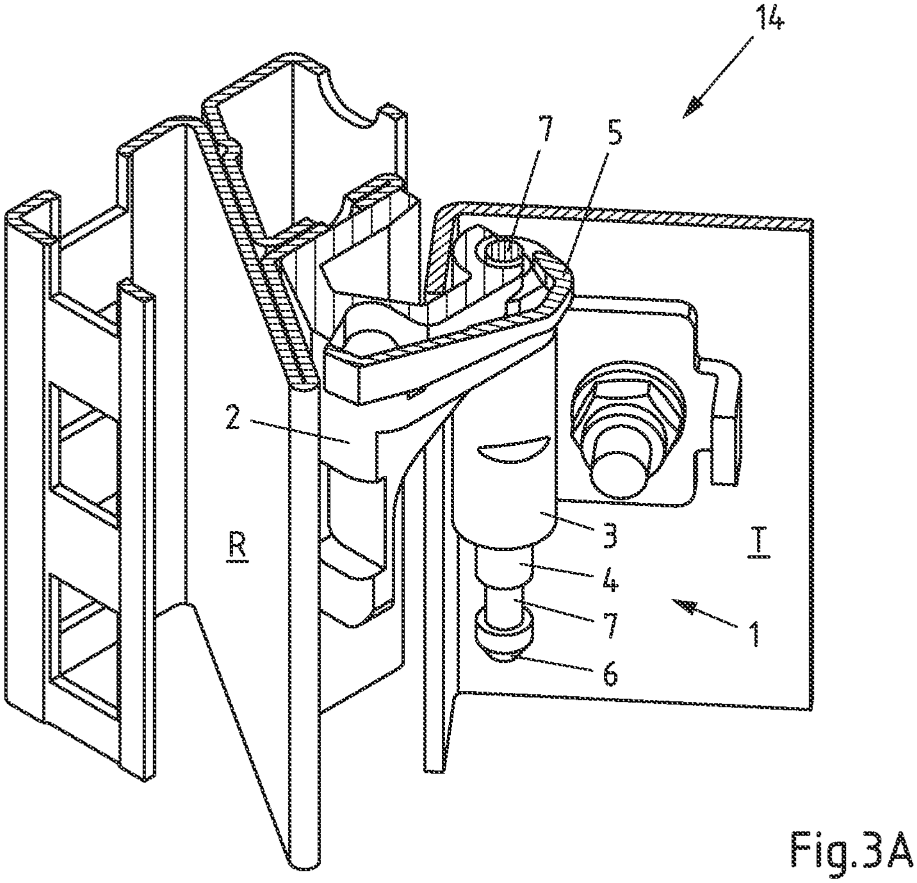
FIG. 3A-3F: the system according to the invention from FIG. 2 in different swivel positions in perspective view.
Figure 3B:
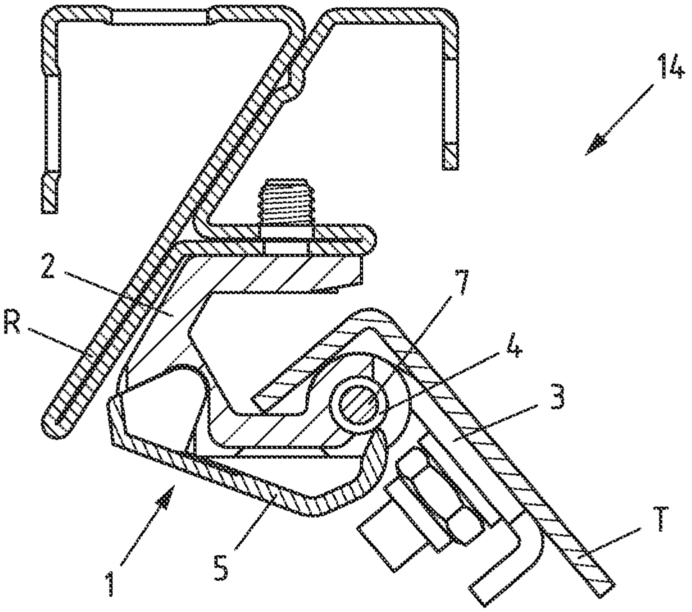

FIG. 3A shows the hinge 1 in an open position in which the locking element 5 is in the release position, i.e. it does not engage into the recess 9 of the pin receiver 8. This situation may occur, for example, immediately after the door has been "mounted", i.e. immediately after the hinge pin 4 has been pushed into the pin receiver 8. FIG. 3B shows the hinge from FIG. 3A in a sectioned view. In the sectioned view, it is particularly clear that the locking element 5 with its hook-shaped end does not yet engage into the recess 9 of the pin receiver 8 and thus cannot yet block the locking groove 7 of the hinge pin 4.

Figure 3C:
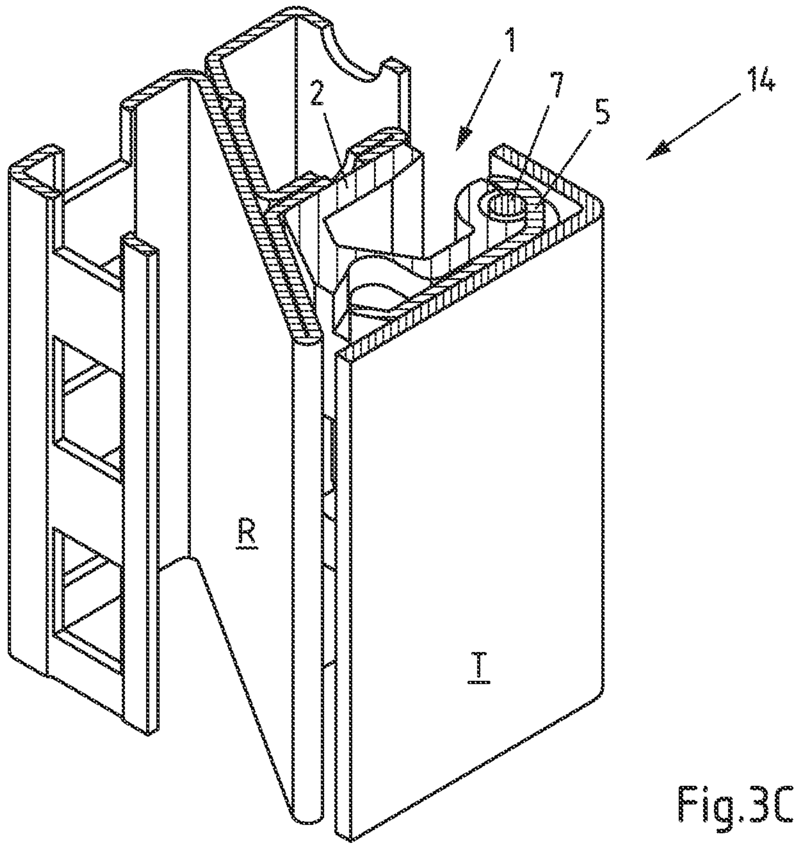
Figure 3D:
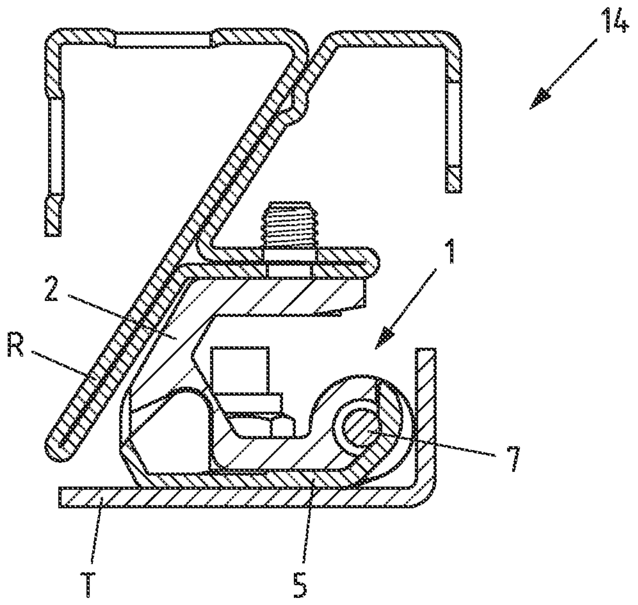

FIG. 3C shows the hinge 1 in a closed position in which the locking element 5 is in the locking position, i.e. the locking element 5 engages into the recess 9 of the pin receiver 8. This situation may occur, for example, after door T has been locked for the first time. FIG. 3D shows the hinge from FIG. 3C in a sectioned view. In the sectioned view, it is particularly clear that the locking element 5 with its hook-shaped end engages into the recess 9 of the pin receiver 8 and can thus block the locking groove 7 of the hinge pin 4. When swivelling the frame part 2 and the door part 3 from the open position (FIG. 3A, FIG. 3B) to the closed position (FIG. 3C, FIG. 3D), the door T has adjusted the locking element 5 from the release position to the locking position. The locking element 5 is therefore automatically pressed into the locking position ("locked position") when the door T is closed, whereby it can be ruled out that the hinge 1 accidentally remains in an unlocked position.

Figure 3E:
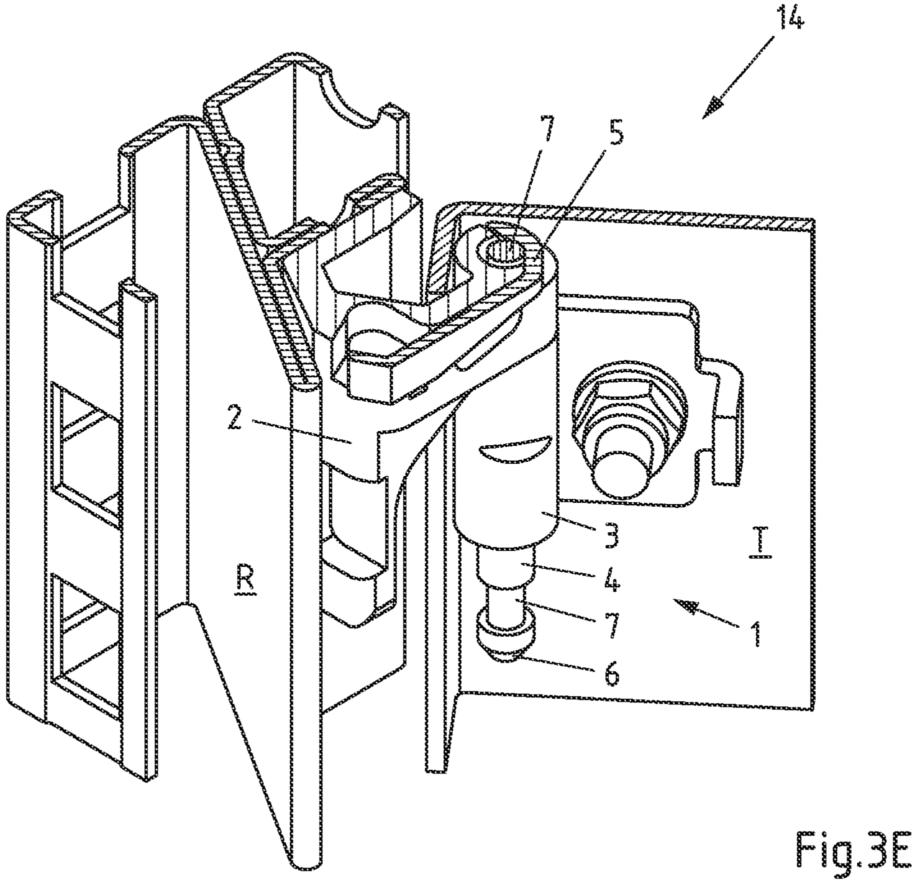
Figure 3F:
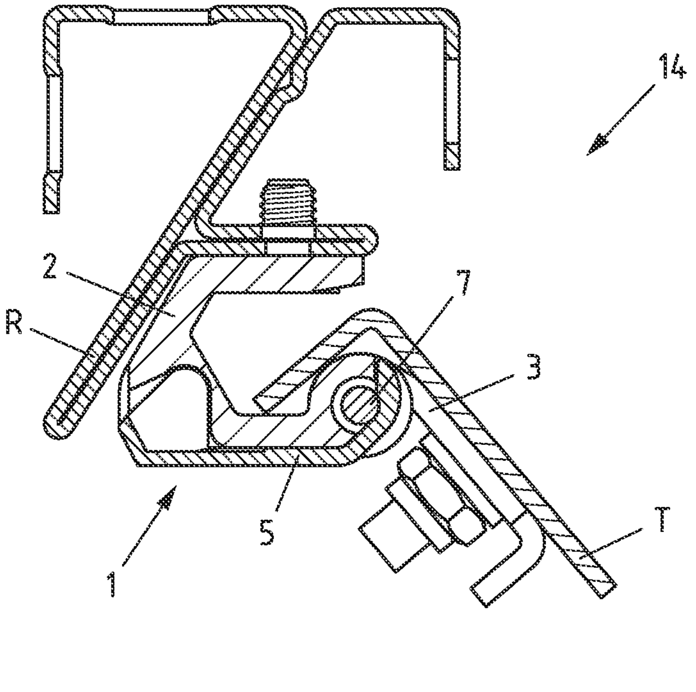

FIG. 3E shows (like FIG. 3A) the hinge 1 in an open position in which the locking element 5 (unlike FIG. 3A) is in the locking position, i.e. the locking element 5 engages into the recess 9 of the pin receiver 8. This situation may occur, for example, after the door T has been mounted and after the hinge 1 has been locked (e.g. by the first closing of the door T described above). FIG. 3E thus represents the correct operating condition. FIG. 3F shows the hinge from FIG. 3E in a sectioned view. In the sectioned view, it is particularly clear that the locking element 5 with its hook-shaped end engages into the recess 9 of the pin receiver 8 and can thus also continue to block the locking groove 7 of the hinge pin 4.

LIST OF REFERENCE NUMERALS

- 1: Hinge
- 2: Frame part
- 3: Door part
- 4: Hinge pin
- 5: Locking element
- 6: Adjustment surface
- 7: Locking groove
- 8: Pin receiver
- 9: Recess
- 10: Contact surface
- 11: Borehole
- 12: Closure receiver
- 13: Closure element
- 14: System
- A: Pin axis (of hinge pin 4)
- R: Frame
- T: Door

The invention claimed is:

1. A hinge for detachably connecting a door to a frame, comprising:

a frame part for fastening to the frame, a door part for fastening to the door, a hinge pin with a pin axis, and a locking element, wherein the frame part and the door part can be moved relative to one another along the pin axis between a swivel position and an assembly position, wherein the frame part and the door part are connected to one another in the swivel position in such manner that the frame part and the door part can be swivelled relative to one another about the pin axis between an open position and a closed position, wherein the locking element can be adjusted from a locking position to a release position, wherein the movement of the frame part and of the door part relative to one another along the pin axis from the swivel position to the assembly position is blocked in a positive-locking manner by the locking element in the locking position and is released in the release position, and wherein the frame part and the door part can be positionable relative to one another between two different swivel positions for connecting the door to opposing sides of the frame, and wherein the locking element is held on the frame part or on the door part so as to be positionable between the locking position and the release position.

2. The hinge according to claim 1, wherein the frame part and the door part can each be moved relative to one another along the pin axis from the swivel positions in each case to an assembly position and back.

3. The hinge according to claim 1, wherein the locking element is connected in the locking position in a positive-locking manner to the hinge pin in such manner that the movement of the frame part and of the door part from the swivel position to the assembly position is blocked.

4. The hinge according to claim 3, wherein the positive-locking connection between the locking element and the hinge pin is disengaged in the release position of the locking element.

5. The hinge according to claim 1, wherein the hinge pin has a locking groove, and in that, in the swivel position of the frame part and of the door part, the locking element engages in a positive-locking manner into the locking groove in the locking position.

6. The hinge according to claim 5, wherein the locking element is arranged outside the locking groove in the release position.

7. The hinge according to claim 1, wherein the frame part has a contact surface for contact with the frame or the door part has a contact surface for contact with the door and in that the contact surface is designed in such manner that the frame resting on the contact surface or the door resting on the contact surface adjusts the locking element from the release position to the locking position when the frame part and the door part are swivelled from the open position to the closed position and/or the frame resting on the contact surface or the door resting on the contact surface blocks the adjustment of the locking element from the locking position to the release position in a positive-locking manner in the closed position of the frame part and of the door part.

8. The hinge according to claim 1, wherein the locking element can be adjusted against a restoring force of a spring means from the locking position to the release position and in the direction of the restoring force from the release position to the locking position.

9. The hinge according to claim 1, wherein the frame part and the door part are connected to one another in a positive-locking manner in the closed position in such manner that the movement of the frame part and of the door part from the swivel position to the assembly position is blocked, and in that the positive-locking connection between the frame part and the door part is disengaged in the open position.

10. The hinge according to claim 9, wherein the frame part has a closure receiver and the door part has a closure element or the frame part has a closure element and the door part has a closure receiver, and in that, in the closed position of the frame part and of the door part, the locking element engages into the closure receiver.

11. The hinge according to claim 1, wherein the hinge pin has an adjustment surface arranged at an angle to the pin axis for adjusting the locking element from the locking position to the release position when the frame part and the door part are moved from the assembly position to the swivel position.

12. The hinge according to claim 11, wherein the adjustment surface is a conical adjustment surface.

13. The hinge according to claim 1, wherein the frame part or the door part has a pin receiver for receiving the hinge pin in sections in the swivel position of the frame part and of the door part.

14. The hinge according to claim 13, wherein the pin receiver has a recess for partially engaging through the locking element in the locking position.

15. The hinge according to claim 13, wherein the pin receiver is designed in a sleeve shape, at least in sections.

16. The hinge according to claim 14, wherein the pin receiver is between the two longitudinal ends.

17. The hinge according to claim 14, wherein in the swivel position of the frame part and of the door part, the locking element engages in the locking position through the recess into a locking groove of the hinge pin.

18. The hinge according to claim 1, wherein the locking element can be adjusted from the locking position to the release position and back without tools.

19. The hinge according to claim 1, wherein the hinge pin is fastened to the frame part or to the door part.

20. A system for detachably connecting a door to a frame, comprising:

a frame, a door, and a hinge, wherein the hinge is designed according to claim 1.

21. A system for detachably connecting a door to a frame according to claim 20, wherein the frame is formed by a sheet metal cabinet.

22. A system for detachably connecting a door to a frame according to claim 20, wherein the door is a sheet metal door.

* * * * *